United States Patent Office 3,539,553
Patented Nov. 10, 1970

3,539,553
AMMONIUM PHOSPHATE DERIVATIVES OF STARCH
Norman E. Lloyd, Clinton, Iowa, assignor to Standard Brands Incorporated, New York, N.Y., a corporation of Delaware
No Drawing. Continuation-in-part of application Ser. No. 487,566, Sept. 15, 1965. This application Aug. 30, 1968, Ser. No. 756,397
Int. Cl. C08b 19/04
U.S. Cl. 260—233.5    13 Claims

ABSTRACT OF THE DISCLOSURE

This invention relates to ammonium mono-starch phosphates. The ammonium mono-starch phosphates have a molar ratio of nitrogen to phosphorus of foam about 0.01 to about 2.

The ammonium mono-starch phosphate is prepared by heating starch granules impregnated with ammonium metaphosphate or polyphosphate and containing less than 25 percent moisture, at a temperature from about 100° to 160° C., while permitting evaporation of water, for a time to effect reaction between the starch and the ammonium metaphosphate or the ammonium polyphosphate.

The ammonium mono-starch phosphates are useful as improved adhesives and sizing agents for paper and textiles, as emulsion stabilizers and as thickeners for food.

---

This application is a continuation in part of application Ser. No. 487,566, filed Sept. 15, 1965, now abandoned.

This invention relates to ammonium mono-starch phosphates. More particularly, the present invention relates to ammonium mono-starch phosphates having a molar ratio of nitrogen to phosphorus of from about 0.01 to about 2.

The ammonium mono-starch phosphates, depending upon the particular reagents used and the conditions of preparation, have properties which make them suitable for a large number of applications; for example as improved adhesives and sizing agents for paper and textiles, as emulsion stabilizers and as thickeners for foods.

The ammonium mono-starch phosphates of the present invention may be produced by reacting an ammonium metaphosphate or an ammonium polyphosphate with starch.

The term "starch" as used herein includes all raw starches such as corn, tapioca, potato, wheat, sago, arrowroot, rice and the like, and various modified starches and derivatives of starch, such as oxidized starches, starch ethers, starch esters and the like, the only requirement being that the starch contains free hydroxyl groups.

Preferably the ammonium mono-starch phosphates are produced by forming a slurry of starch granules, water and ammonium metaphosphate or ammonium polyphosphate at a desirable pH, thus impregnating the starch granules with the phosphorylating agent, separating the impregnated starch from the mixture by means well known in the art, i.e., filtration, decantation or centrifugation, drying the starch, if necessary, to a moisture content below about 25 percent at a low temperature and then heating the starch for a sufficient time to effect reaction between the starch and ammonium metaphosphate or ammonium polyphosphate. If desired, the ammonium mono-starch phosphate may be purified by washing with water, and/or a mixture of water and a water soluble organic solvent.

It has been found that the pH of the slurry containing the ammonium metaphosphate or ammonium polyphosphate, water and starch plays an important part in the properties of the ammonium mono-starch phosphates produced.

When an ammonium polyphosphate, for instance, the pyrophosphate or higher homologues, is used as the phosphoxylating agent satisfactory ammonium mono-starch phosphates are produced in the pH range of from about 3 to about 9. At pH levels below about 3, depolymerization of the starch results when it is later heated to the reaction temperature. When ammonium metaphosphate is used as the phosphorylating agent, a satisfactory ammonium mono-starch phosphate is produced in the pH range between about 4 and about 9. At pH levels below about 4, depolymerization of the starch results when it is later heated to the reaction temperature. However, in both cases, in the pH range from about 5 to about 9 the most desirable ammonium mono-starch phosphate is produced. Although at pH levels above about 9, except about 11.5 which causes alkaline degradation of starch, the starch is not substantially affected in a deleterious manner, there is a loss of ammonia during the reaction, therefore making these pH levels unsuitable from an economic viewpoint. The phosphate salts may be formed in situ in the starch slurry by the addition of metaphosphoric acid or polyphosphoric acid and ammonium hydroxide. The proportion of the reagents is, of course, dependent on the desired pH. It is preferred to use a polyphosphoric acid because of the economic factors involved therewith. The higher the pH of the slurry (within the preferred range), the more viscous are the pastes prepared from the ammonium mono-starch phosphates.

The pH of the slurry also affects the molar ratio of nitrogen to phosphorus in the ammonium mono-starch phosphate. Ammonium mono-starch phosphates prepared at low slurry pH's contain low ratios of nitrogen to phosphorus while ammonium mono-starch phosphates prepared at higher slurry pH's will contain a higher molar ratio of nitrogen to phosphorus.

After separation of the excess liquid from the impregnated starch, it is preferred to dry the impregnated starch at a low temperature to a moisture content below about 25 percent by weight to avoid substantial hydrolysis of the phosphorylating agent. Also, gelatinization of the starch may be substantially avoided by maintaining a low drying temperature when it is desired to produce ammonium mono-starch phosphates having the granular structure of untreated starch. It is a preferred embodiment of the present invention to provide an ammonium mono-starch phosphate having the granular structure of untreated starch. To this end, the best results have been obtained by drying the impregnated starch at a temperature between about ambient temperature and 85° C. Of course, a vacuum may be used in order to facilitate the drying.

The resulting semi-dry starch impregnated with the phosphorylating agent is heated, while further removing moisture, for a time sufficient to effect reaction between the starch and the ammonium metaphosphate or ammonium polyphosphate. The time and temperature are interdependent; that is, at low temperatures it is necessary to heat for longer periods of time than at higher temperatures to effect the same degree of reaction. The preferred temperature range is between about 100° and about 160° C. At temperatures substantially higher than 160° C. and at heating times greater than about 1 hour, discoloration and/or dextrinization of the ammonium mono-starch phosphates may result. This makes the ammonium mono-starch phosphates unsuitable for certain applications, i.e., food uses, etc. The most desirable ammonium mono-starch phosphates are obtained by heating at temperatures of from about 110° to about 140° C. for a time from about one hour to about 4 hours.

The ammonium mono-starch phosphate may be washed with water and/or a solution of water and a water miscible organic solvent, for example methanol or acetone, to remove unbound phosphates which tend to reduce the viscosity of the ammonium mono-starch phosphate when it is pasted in water.

The ammonium mono-starch phosphates of the present invention having a phosphorus content greater than 0.07 moles of phosphorus per anhydroglucose unit (molecular weight 162) are cold water pasting. "Cold water pasting" is a term indicating a starch's ability to form a viscous paste spontaneously when suspended in water at room temperature. If a starch is cross-linked, it will not be cold water pasting since the cross-links will prevent the starch from hydrating.

The prior art describes processes for phosphorylating starch with alkali metal salts of condensed phosphates. When such salts are used as phosphorylating agents under certain reaction conditions of the present invention, the resulting alkali metal phosphate-starch derivatives have much less tendency to be cold water pasting than the ammonium mono-starch phosphates of the present invention, and in some cases the cold water pasting property is completely absent, which indicates that these prior art starch derivatives are substantially cross-linked owing to the presence of distarch phosphate bonds. The cold water pasting properties of the ammonium mono-starch phosphates of the present invention were totally unexpected and surprising. Also, according to the prior art, alkali metal mono-starch phosphates can be produced only at very selected and carefully controlled pH levels, drying and reaction temperatures. In the present invention, on the other hand, when ammonium phosphates are used as the phosphorylating agents, a wide latitude of reaction conditions may be employed to produce the ammonium mono-starch phosphates.

The ammonium mono-starch phosphates of the present invention contain a molar ratio of nitrogen to phosphorus of from about 0.01 to about 2. The most preferred mono-starch phosphates of the present invention contain a molar ratio of nitrogen to phosphorus of from about 0.8 to about 1.2. The phosphorus content of the ammonium mono-starch phosphates may vary widely, but typically the molar ratio of bound phosphorus to anhydroglucose unit (molecular weight 162) will be from about 0.005 to about 0.4 and preferably will be from about 0.02 to about 0.1.

Aqueous pastes of the amomnium starch phosphates of the present invention are exceptionally stable. For example, when pastes of the ammonium starch phosphates are frozen and thawed, a severe test of stability, the pastes will maintain their smooth fluid characteristics, whereas when an aqueous paste of unmodified cornstarch is subjected to the same treatment, the paste will lose its smooth fluid character, and there is observed the formation of an opaque, spongy precipitate.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout the specification, percentages are intended to refer to percent by weight unless otherwise specified.

The analytical procedures and testing methods referred to in the examples were performed as follows:

Viscosity of pastes of the ammonium mono-starch phosphates

To determine viscosity of pastes of the ammonium mono-starch phosphate, a slurry containing 6 grams of the ammonium mono-starch phosphate per 100 ml. of slurry was heated in a viscometer to 95° C., held at 95° C., for 30 minutes, then cooled to 50° C., held at 50° C. for an additional 30 minutes, and the viscosity determined. The viscometer was a Brabender VISCO/amylo/Graph made by C. W. Brabender Instruments Inc.

Phosphorus content of the air dried filter cakes

The phosphorus content of the air-dried filter cakes was determined by placing a one-half gram sample of the filter cake into a platinum crucible and adding 2 ml. of a 3 percent sodium carbonate solution. The mixture was heated on a hot plate to remove water, charred over a flame, and ignited in a muffle furnace at 600° C. for 18 hours. The sample was then cooled, 2 drops of concentrated nitric acid aded, and the sample returned to the muffle furnace at 600° C., for 30 minutes. The sample was cooled, 10 ml. of concentrated nitric acid added and the phosphorus determination completed as described in "Official Methods of Analysis," A.O.A.C., Tenth Edition, 1965, Section 2.028(a).

pH Determinations

The pH of the filter cakes after the air-drying step and the pH of the reaction mixtures after the heating step was determined by suspending 10 g. thereof in 50 ml. of distilled water, stirring 5 minutes, and then measuring the pH of the slurry with a glass electrode.

Fluidity

Fluidities of pastes of the ammonium mono-starch phosphates were determined according to the method of Fitzer and Kirst which is described in Cereal Chemistry, vol. 36, pp. 108–127 (1959).

Freeze-thaw stability

The freeze-thaw stability of the starch samples was determined by preparing a paste of the starch sample containing 2 percent dry substance starch sample and centrifuging the paste at 2000 r.p.m. for 4 hours in a perforated cup lined with filter paper. During the centrifugation any liquid phase passes through the filter paper under the influence of the high gravitational force leaving behind only the hydrated semi-solid phase. The amount of water retained in the semi-solid phase was determined gravimetrically. Another paste of the same starch sample at 2 percent dry substance starch was frozen and thawed one or more times, subjected to centrifugation in the same manner indicated above and the amount of water retained in the semi-solid phase determined gravimetrically. The amount of water retained in the semi-solid phase of the starch paste which was subjected to freeze-thawing as compared to the amount of water retained in the semi-solid phase which was not subjected to freeze-thawing expressed as a percentage is the percent hydration after freeze-thaw. The precision of this test is about ±3 percent. Any relatively large increase or decrease in the percent hydration is an indication of instability of the starch paste. Good correlation exists between changes in the percent hydration and changes in appearance and texture of starch pastes on freezing and thawing. Pastes which show little change in percent hydration retain their smooth, fluid character after freezing and thawing whereas those showing large changes do not.

Flocculating ability

The flocculating ability of the starch samples was determined by the method of LaMer (Journal of Colloid Science, vol. 12, pp. 230–239, 1957). Various amounts of starch samples were added to aqueous slurries of clay containing 500 p.p.m. calcium chloride. The slurries were agitated and then filtered with suction through Whatman No. 3 filter paper on a Buchner funnel (Coors No. 2). The filtration rate of the first 35 ml. of filtrate from 100 ml. of slurry was determined.

LaMer showed that as the degree of flocculation increases, so also does filtration rate. The slurries containing the ammonium mono-starch phosphates of the present invention filtered faster than slurries containing unmodified cornstarch.

Emulsion stabilization

The stabilizing action of the starch sample towards emulsions containing 50 volume percent of colored corn oil as the dispersed phase were determined by observation of the changes in the average particle diameter of the dispersed oil phase during storage of the emulsions at room temperature. The method for determining changes in average particle diameter has been described by Lloyd in the Journal of Colloid Science, vol. 14, pp. 441–451, 1959.

EXAMPLES 1–7

These examples illustrate the effects of the initial pH of the slurries on the efficiency of the reaction and on the viscosity and fluidity of aqueous pastes of the ammonium mono-starch phosphates.

Three hundred and fifty ml. of deionized water was placed in a 1000 ml. beaker and the electrodes of a pH meter immersed therein. Sixty grams of metaphosphoric acid pellets (0.75 mole of phosphorus per moles of starch) were added with stirring and while they were dissolving, concentrated ammonium hydroxide (29 percent $NH_3$) was added at a rate just sufficient to maintain the pH of the solution as close as possible to the selected pH indicated in Table 1 under column marked "Initial Mixture." After dissolution of the acid was complete, a final adjustment of the pH was made to exactly that shown in Table 1 under column marked "Initial Mixture." The volume of the solution was then brought to 500 ml. with water and 180 grams of cornstarch containing 10 percent moisture were added. The mixture was stirred for 20 minutes at a temperature of 25–30° C. and then filtered with suction. The filter cake was crumbled and air-dried at room temperature to a moisture content of about 9–16 percent. A small portion of the sample was suspended in water and the pH thereof measured. The pH of the sample is shown in Table 1, under the column marked "After Air-Drying."

A total of seven starch-ammonium metaphosphate mixtures were prepared in this manner with the pH of the mixture adjusted to the values indicated in Table 1 under the column marked "Initial Mixture." The air-dried mixtures were heated in a vacuum oven for two hours at 120° C. and 24 inches of mercury negative pressure. A small amount of dry-air was passed through the oven continuously to aid in the removal of moisture. After cooling, the products were suspended in 500 ml. of water. The pH's of the products were determined and are shown in Table 1, under the column marked "After Heating." The pH of the slurries was adjusted to 5.0 with dilute ammonium hydroxide or phosphoric acid. The slurries were then filtered and the filter cakes washed with distilled water and then twice with water or with 50 percent aqueous methanol. The resulting filter cakes were air-dried. Table 1 shows the results of analysis and testing of the products prepared at the different pH levels. In Example 7, a strong ammonical odor was noted during the air-drying step indicating that an excess of ammonium hydroxide was present.

Aqueous pastes of these ammonium mono-starch phosphates were compared with aqueous pastes of unmodified cornstarch in respect to fluidity and viscosity. Pastes of the ammonium mono-starch phosphates were very stable, showing no appreciable change in fluidity on standing at room temperature for 24 hours (see Table 1, under the column marked "24-Hr. Paste"). Moreover, there was no discernible change in clarity or appearance of the pastes of the ammonium mono-starch phosphate on standing. Unmodified cornstarch paste, on the other hand, became much less fluid on standing for the 24-hour period (see Table 1, under the column marked "24-Hr. Paste"), with the formation of lumps, and showed a very noticeable increase in opacity. The viscosities of pastes of the products of Examples 1, 2, and 3 were lower than that of a paste of unmodified starch. This was due to the acidic conditions that prevailed during their preparation and resulted in depolymerization of these products.

EXAMPLES 8–11

These examples illustrate the use of ammonium polyphosphate as the phosphorylating agent and the effect of four different initial pH levels on the efficiency of the reaction and the viscosity of the ammonium mono-starch phosphates produced.

The polyphosphoric acid used in this example and other examples was a commercial product having an average $P_2O_5$ content of 83 percent and approximately the following composition.

| Anion classification | No. of phosphorus atoms in chain | Percent |
|---|---|---|
| Orthophosphate | 1 | 3 |
| Pyrophosphate | 2 | 15 |
| Tripolyphosphate | 3 | 18 |
| Tetrapolyphosphate | 4 | 18 |
| Pentapolyphosphate | 5 | 16 |
| Hexapolyphosphate | 6 | 9 |
| Heptapolyphosphate | 7 | 7 |
| Higher homologues | >7 | 14 |

To a mixture containing 486 grams of cornstarch (3 moles) and 824 grams of water was added 63.8 grams of polyphosphoric acid (0.75 moles of phosphorus per mole of starch) plus a sufficient amount of ammonium hydroxide (29 percent $NH_3$) to achieve the selected pH indicated in Table 1 under the column marked "Initial Mixture." This mixture was stirred for 30 minutes at 50° C. and then filtered with suction. A total of four starch-ammonium polyphosphate mixtures were prepared in this manner. The mixtures were stirred for 20 minutes at a temperature of 25–30° C. and filtered with suction. The filter cakes were crumbled and air-dried at room temperature to a moisture content of about 9–16 percent. Small portions of the dried filter cakes were suspended in water and the pH measured (see Table 1, under the column marked "After Air-Drying"). The mixtures were placed in an air-oven for 30 minutes at 130 C. The pH of the mixtures were measured upon a small portion of the mixtures (see Table 1, under the column marked "After Heating"). The mixtures were suspended in water and the pH of the suspensions was adjusted to 5.0 with either ammonium hydroxide or phosphoric acid. The slurries were then filtered and the filter cakes washed with water and methanol. The viscosities and fluidities of the products are shown in Table 1.

EXAMPLES 12–22

These examples illustrate the effect of different reaction temperatures on the properties of the ammonium mono-starch phosphates.

When ammonium metaphosphate was used as the phosphorylating agent (Examples 12–17), a mixture containing 1,944 grams of cornstarch, 2,950 grams of water and 240 grams of metaphosphoric acid pellets (0.25 mole of phosphorus per mole of starch) was formed in accordance with the procedure outlined in Examples 1–7. The pH of the initial mixture was 5.6. The mixture was stirred for 30 minutes at a temperature of 50° C. and filtered, and the filter cake air-dried. The pH of the filter cake, measured by suspending a small portion in water, was found to be 6.1. The dried filter cake was divided into 6 equal portions and each portion was heated in a mechanical convection air-oven for 1 hour at a different temperature shown in Table 2 under the column marked "Oven Temperature." After cooling, the portions were suspended in water and the pH of the slurries adjusted to 5 with orthophosphoric acid or with ammonium hydroxide. The slurries were then filtered and washed twice with 50 or 70 percent aqueous methanol. Because the ammonium mono-starch phosphate in Example 17 was partially cold-water swelling, it was washed 5 times with 70 percent aqueous methanol.

When ammonium polyphosphate was used as the phosphorylating agent (Examples 18-22) a mixture containing 2,430 grams of cornstarch (15 moles), 3,710 grams of water, 319 grams of polyphosphoric acid (3.75 moles of phosphorus) and 435 ml. of 29 percent ammonium hydroxide was formed in accordance with the procedure outlined in Examples 8-11. The mixture was held at 50° C. for 30 minutes and filtered, and the filter cake air-dried. A phosphorus determination of the air-dried material showed that the filter cake contained 0.079 moles of phosphorus per anhydroglucose unit. The filter cake was then divided into 5 equal portions and each portion was heated for 1 hour in an air-oven at a different temperature shown in Table 2 under the column marked "Oven Temperature." After cooling, the portions were first washed with water or a methanol-water solution and then washed with methanol-water solution or absolute methanol. During the first wash, the pH of the portions was adjusted to about 5 with either ortho-phosphoric acid or ammonium hydroxide.

As seen from the results shown in Table 2 under the column "Oven Temperature," as the temperature was raised, the efficiency of the reaction increased markedly, while the pH of the reaction products decreased progressively as shown in Table 2 under the column marked "pH After Heating." At a reaction temperature of 150° C. the acid produced was great enough to result in depolymerization of the product as shown by the relatively low paste viscosity of the product as compared to the paste viscosity of the untreated cornstarch (see Table 2, under the column marked "Viscosity"). Nevertheless, from Table 2, under the column marked "24-Hr. Paste," it is seen that all the products showed greatly improved paste stability as compared to a paste of unmodified cornstarch.

EXAMPLES 23-25

These examples illustrate the effect of varying the time of reaction at 130° C. between starch and ammonium polyphosphate.

The reaction mixtures were prepared in accordance with the procedure outlined in Examples 8-11, except that the pH of the initial mixtures was maintained at 8.0. As seen from Table 3, when the pH of the reaction product is about 3, the product is depolymerized. This is shown by the reduced viscosity of pastes of the products as compared to the viscosity of a paste of unmodified cornstarch (see Table 3, under the column marked "Viscosity").

EXAMPLES 26-30

These examples illustrate the effect of varying the amount of ammonium polyphosphate on the ammonium phosphate starch product produced. The ammonium phosphate starch products were prepared generally in accordance with the procedure outlined in Examples 8-11 except that the pH of the initial mixture was adjusted to 8 and varying amounts of the phosphorylating agent used. As the amount of ammonium polyphosphate was increased, there was an increase in the degree of substitution. The higher the degree of substitution of the products, the more they tended to be cold water pasting. Consequently, it was necessary in the purification of the products to use aqueous solutions containing methanol in order to suppress the swelling of the starch granules which could impede filtration, higher proportions of methanol being required for the products of higher degree of substitution. In general, it was found possible to wash products with degrees of substitution of about 0.04 or less entirely with water without resorting to methanol solutions. For products of higher degree of substitution, up to about 0.07, it was possible to wash the first time with water without seriously impeding filtration rate. Second and third washed required the addition of methanol to the washing solution since there was considerably less unreacted phosphate salts left in the starch granules to reduce swelling. Products of degree of substitution higher than about 0.07 required washing with aqueous methanol solutions during the first wash in order to get appreciable filtration rates.

All of the products prepared in Examples 26-30 showed thick-boiling properties as indicated by their viscosities shown in Table 3. When the degree of substitution of the products was increased to 0.07, a cold water pasting product resulted, i.e. the products when suspended in cold water spontaneously formed a thick paste.

It was also determined that as the degree of substitution was increased, freeze-thaw stability of pastes made from the products also increased. Pastes of products of Examples 28, 29, and 30 had 75, 101 and 106 percent hydration respectively after 4 freeze-thaw cycles, as compared to a cornstarch paste which had only a 14 percent hydration after four cycles. The texture and consistency of the pastes of products of Examples 29 and 30 after four freeze-thaw cycles was substantially unchanged from that of the fresh paste as compared to the behavior of a paste of unmodified cornstarch in this respect which upon freezing and thawing only once reverted to a coarse stringy texture with none of the properties normally associated with starch pastes.

Products of Examples 29 and 30 were tested for their flocculating ability towards coating clay dispersions. The filtration rate of a 10 percent coating clay slurry (ASP 602, Minerals and Chemicals Corp.) containing 500 p.p.m. of calcium chloride was increased by a factor of 1.7 by the addition of 150 p.p.m. of the product of Example No. 29. A similar increase in filtration rate was noted upon addition of 110 p.p.m. of the product of Example No. 30. Unmodified cornstarch tested in the same manner, on the other hand, had no tendency to increase the filtration rate of a clay slurry.

The product of Example 30 was also tested for its emulsion stabilizing ability. A mixture containing 50 volume percent of dispersed corn oil and 50 volume percent of 1 percent paste of the product of Example No. 30 prepared in cold water was passed through a hand homogenizer three times resulting in an emulsion with an average particle diameter of 5.2 microns. Upon standing for three weeks, the average particle size had increased to only 7.6 microns showing that a high order of stability was conferred upon the emulsion by the ammonium starch phosphate.

EXAMPLE 31

This example illustrates certain differences in properties of the ammonium mono-starch phosphates of the present invention as compared to a modified starch made with an alkali metal polyphosphoric acid.

A mixture of 512 grams of polyphosphoric acid (2.0 moles phosphorus), 360 grams of sodium hydroxide pellets and 696 ml. of water was prepared with cooling in order to prevent hydrolysis of the polyphosphoric acid. 512 grams of cornstarch (containing 10.2 percent moisture) was added and the mixture stirred for 20 minutes. The pH of the mixture was 7.0. The temperature of the mixture was raised to 60° C. and held there for 30 minutes with stirring. The starch was then treated generally in the same manner as outlined in Examples 8–12, except that the treated starch was heated at 140° C. for four hours. The modified starch was then purified by washing once with an aqueous solution of 33 percent methanol, 70 percent methanol, 90 percent methanol, and then three times with 70 percent methanol.

As shown in Table 4, the final paste viscosity of this modified starch was less than that of unmodified starch. Furthermore, and despite the relatively high degree of substitution of this product, it did not form a thick paste in cold water. A 6 percent suspension of this product prepared at 25° C. had a viscosity of only 10 Brabender units whereas a 6 percent suspension of the product of Example 29 prepared at 25° C. (Table 3), which had approximately the same degree of substitution, had a viscosity of 1820 Brabender units. This difference in viscosity indicates that the starches made with alkali metal phosphates under these conditions have a greater degree of cross-bonding due to the establishment of di-starch phosphate bonds than ammonium phosphate modified starches. It is well established in the art that substantial cross-bonding of starch inhibits granular swelling which consequently reduces the viscosity of pastes prepared therefrom.

EXAMPLES 32–33

These examples illustrate certain differences in the properties of the ammonium starch phosphate of the present invention as compared to a modified starch made wiht an alkali metal metaphosphate.

A mixture of 486 grams of cornstarch and 743 ml. of water was placed in a beaker immersed in a water bath at room temperature. Three hundred and sixty grams of metaphosphoric acid pellets (1.5 moles phosphorus per mole of starch) were then added to the beaker and the mixture stirred for 30 minutes. The pH of the mixture was adjusted to 8.0 with concentrated sodium hydroxide and the temperature of the mixture raised to 70° C. and held there for 30 minutes with stirring. The mixture was then filtered and the filter cake air dried. The air-dried material was heated in an air-oven for one hour at 140° C. Part of the resulting crude product was purified by suspending in water, adjusting to pH 5 with phosphoric acid and adding methanol and then filtering. The filter cake was then washed 5 times with 70 percent methanol and the resultant filter cake air-dried.

An ammonium mono-starch phosphate of the present invention (Example 33) was prepared in exactly the manner decribed in Example 32 except that concentrated ammonium hydroxide was substituted for the concentrated sodium hydroxide. As seen from Table 3, this product showed excellent cold-water pasting properties whereas the product of Example 32 made under exactly the same conditions had no tendency to be cold-water pasting.

TABLE 1.—AMMONIUM METAPHOSPHATE AS THE PHOSPHORYLATING AGENT

| Example No. | pH Initial mixture | pH After air-drying | pH After heating | Degree substitution | Moles of nitrogen per mole of phosphorus | Aqueous paste fluidity Fresh paste | Aqueous paste fluidity 24-hr. paste | Conc. (g./300 ml.) | Viscosity (Brabender units) |
|---|---|---|---|---|---|---|---|---|---|
| 1 | 3.1 | 3.6 | 3.7 | 0.021 | 0.8 | 80 | 79 | 6 | 184 |
| 2 | 4.0 | 4.7 | 4.5 | 0.017 | 0.8 | 68 | 67 | 6 | 380 |
| 3 | 5.0 | 5.7 | 5.6 | 0.020 | 0.7 | 59 | 56 | 6 | 565 |
| 4 | 6.0 | 6.6 | 6.2 | 0.010 | 1.0 | 75 | 75 | 6 | 650 |
| 5 | 7.1 | 7.5 | 6.7 | 0.006 | 1.5 | 55 | 59 | 8 | 720 |
| 6 | 8.1 | 7.7 | 6.4 | 0.007 | 1.1 | 60 | 59 | 8 | 760 |
| 7 | 9.1 | 7.8 | 6.8 | 0.005 | 1.5 | 57 | 58 | 8 | 745 |
| Ammonium polyphosphate as the phosphorylating agent | | | | | | | | | |
| 8 | 3.0 | 4.6 | 4.1 | 0.021 | 1.2 | | | | 425 |
| 9 | 5.0 | 5.9 | 5.0 | 0.016 | 1.5 | | | | 605 |
| 10 | 8.0 | 7.1 | 5.4 | 0.022 | 1.3 | | | | 715 |
| 11 | 10.0 | 7.4 | 5.6 | 0.016 | 1.4 | | | | 620 |
| Untreated cornstarch | | | | | | 46 | 31 | 9.5 | 580 |

TABLE 2.—AMMONIUM METAPHOSPHATE AS THE PHOSPHORYLATING AGENT

| Example No. | Oven temperature (°C.) | pH, after heating | Degree of substitution | Moles of nitrogen per mole of phosphorus | Aqueous paste fluidity Fresh paste | Aqueous paste fluidity 24-hr. paste | Conc. (g./300 ml.) | Viscosity (Brabender units) | Freeze-thaw cycles | Percent hydration after freeze-thaw |
|---|---|---|---|---|---|---|---|---|---|---|
| 12 | 100 | 5.8 | 0.008 | 1.1 | 56 | 54 | 8 | 640 | | |
| 13 | 110 | 5.7 | 0.016 | 0.8 | 45 | 41 | 8 | 648 | | |
| 14 | 120 | 5.5 | 0.023 | 0.7 | 41 | 38 | 8 | 815 | | |
| 15 | 130 | 5.2 | 0.037 | 0.6 | 45 | 40 | 8 | 812 | 1 | 74 |
| 16 | 140 | 4.6 | 0.042 | 0.5 | 60 | 59 | 8 | 345 | | |
| 17 | 150 | 3.4 | 0.055 | 0.4 | 81 | 80 | 8 | 80 | | |
| Ammonium polyphosphate as the phosphorylating agent | | | | | | | | | | |
| 18 | 110 | 5.3 | 0.012 | 1.1 | | | | 710 | 1 | 35 |
| 19 | 120 | 5.0 | 0.032 | 1.1 | | | | 1150 | 1 | 63 |
| 20 | 130 | 4.7 | 0.041 | | | | | 1240 | 1 | 77 |
| 21 | 140 | 3.5 | 0.051 | 1.1 | | | | 690 | | |
| 22 | 150 | 2.8 | 0.047 | 1.2 | | | | 110 | | |
| Untreated cornstarch | | | | | 43 | 30 | 9.5 | 580 | | |

TABLE 3

| Ex. No. | Phosphorylating agent | Moles P per mole starch in slurry | pH Initial mixture | pH After air-drying | pH After heating | Time (hrs.) | Temp. (°C.) | Degree of substitution | Moles of nitrogen per mole of phosphorus | Viscosity (Brabender units) | Freeze-thaw cycles | Percent hydration after freeze-thaw |
|---|---|---|---|---|---|---|---|---|---|---|---|---|
| 23 | Ammonium polyphosphate | 0.25 | 8.0 | 7.1 | 3.9 | 1 | 130 | 0.041 | 1.2 | 930 | | |
| 24 | do | 0.25 | 8.0 | 7.1 | 3.0 | 2 | 130 | 0.052 | 1.2 | 280 | | |
| 25 | do | 0.25 | 8.0 | 7.1 | 3.0 | 4 | 130 | 0.052 | 1.1 | 40 | | |

TABLE 4

| Ex. No. | Phosphorylating agent | Moles P per mole starch in slurry | pH Initial mixture | pH After air-drying | pH After heating | Time (hrs.) | Temp. (°C.) | Degree of substitution | Moles of nitrogen per mole of phosphorus | Viscosity (Brabender units) | Freeze-thaw cycles | Percent hydration after freeze-thaw |
|---|---|---|---|---|---|---|---|---|---|---|---|---|
| 26 | Ammonium polyphosphate | 0.125 | 8.0 | 6.7 | 4.2 | 1.0 | 130 | 0.020 | 1.2 | 700 | | |
| 27 | do | 0.50 | 8.0 | | 5.4 | 1.0 | 130 | 0.048 | 1.1 | 550 | | |
| 28 | do | 0.75 | 8.0 | | 4.1 | 1.0 | 130 | 0.070 | | 1,260 | 4 | 75 |
| 29 | do | 1.00 | 8.0 | | 4.5 | 1.0 | 130 | 0.098 | 1.6 | 740 | 4 | 101 |
| 30 | do | 2.00 | 9.0 | 6.2 | 6.7 | 1.5 | 130 | 0.230 | 1.5 | 1,650 | 4 | 106 |
| 31 | Sodium polyphosphate | 2.00 | 7.0 | 6.8 | | 4.0 | 140 | 0.108 | | 280 | | |
| 32 | Sodium metaphosphate | 1.5 | 8.0 | 7.9 | 7.5 | 1.0 | 140 | 0.08 | | (²) | | |
| 33 | Ammonium metaphosphate | 1.5 | 8.0 | | | 1.0 | 140 | 0.08 | | (³) | | |
| Unmodified cornstarch | | | | | | | | | | 580 | 4 | 14 |

¹ Viscosity measured at ammonium mono-starch phosphate concentration of 4%.
² Not cold water pasting.
³ Cold water pasting.

What is claimed is:

1. An ammonium mono-starch phosphate having a molar ratio of nitrogen to phosphorus of from about 0.01 to about 2.

2. An ammonium mono-starch phosphate as defined in claim 1 having a bound phosphorus content of from about 0.005 to about 0.4 mole of phosphorus per anhydroglucose unit.

3. An ammonium mono-starch phosphate as defined in claim 2 having a bound phosphorus content of from about 0.02 to about 0.1 mole of phosphorus per anhydroglucose unit.

4. An ammonium mono-starch phosphate as defined in claim 2 having a molar ratio of nitrogen to phosphorus of from about 0.8 to about 1.2.

5. An ammonium mono-starch phosphate as defined in claim 3 having a molar ratio of nitrogen to phosphorus of from about 0.8 to about 1.2.

6. An ammonium mono-starch phosphate as defined in claim 4, wherein the ammonium mono-starch phosphate is in granular form.

7. An ammonium mono-starch phosphate as defined in claim 5, wherein the ammonium mono-starch phosphate is in granular form.

8. A method for preparing an ammonium mono-starch phosphate which comprises heating starch granules impregnated with ammonium metaphosphate or ammonium polyphosphate and containing less than about 25 percent moisture, at a temperature from about 100° to 160° C., while permitting evaporation of water, for a time to effect reaction between the starch and the ammonium metaphosphate or the ammonium polyphosphate.

9. A method for preparing an ammonium mono-starch phosphate as defined in claim 8, wherein the starch granules are impregnated with ammonium metaphosphate or ammonium polyphosphate by forming an aqueous slurry of starch granules and the ammonium metaphosphate or the ammonium polyphosphate and the pH of the slurry is from about 3 to about 9.

10. A method for preparing an ammonium mono-starch phosphate as defined in claim 9, wherein the pH of the slurry is from about 5 to about 9.

11. A method for preparing an ammonium mono-starch phosphate as defined in claim 10, comprising forming an aqueous slurry of starch granules and ammonium metaphosphate or ammonium polyphosphate, separating the starch granules impregnated with the phosphate from the aqueous slurry, reducing the moisture content of the starch to less than 25 percent, heating the impregnated starch granules at a temperature of from about 110° to about 140° C. to effect reaction between the starch and the ammonium metaphosphate or the ammonium polyphosphate.

12. A method for producing an ammonium mono-starch phosphate as defined in claim 11, wherein the moisture content of the starch is reduced by subjecting the impregnated starch granules to a temperature of from ambient to about 85° C.

13. A method for producing an ammonium mono-starch prosphate as defined in claim 12, wherein the starch is subjected to a temperature of from about 110° to about 140° C. for a time of from about 1 to about 4 hours to effect reaction between the starch and the ammonium metaphosphate or the ammonium polyphosphate.

References Cited

UNITED STATES PATENTS

| | | | |
|---|---|---|---|
| 2,801,242 | 7/1957 | Kerr | 260—233.5 |
| 2,884,412 | 4/1959 | Neukom | 260—233.5 |
| 2,993,041 | 7/1961 | Sietsema | 260—233.5 |
| 3,069,411 | 12/1962 | Hjermstad | 260—233.5 |
| 3,320,237 | 5/1967 | Greidinger et al. | 260—233.5 |
| 3,329,673 | 7/1967 | Greidinger et al. | 260—233.5 |
| 3,352,848 | 11/1967 | Christoffel et al. | 260—209 |

DONALD E. CZAJA, Primary Examiner

M. I. MARQUIS, Assistant Examiner

U.S. Cl. X.R.

260—233.3, 234

UNITED STATES PATENT OFFICE
CERTIFICATE OF CORRECTION

Patent No. 3,539,553          Dated November 10, 1970

Inventor(s) Norman E. Lloyd

It is certified that error appears in the above-identified patent and that said Letters Patent are hereby corrected as shown below:

In column 1, line 17, the term "foam" should read --fro[m] Column 2, line 13, the word "phosphoxylating" should read --phosphorylating--. In Examples 8-11, in the table under t[he] heading "Percent", numeral "3" should read --5--; "15" shoul[d] read --18--; "18", second occurrence, should read --16--; "1[6]" should read --13--. Column 10, line 2, the word "wiht" shou[ld] read --with--. In Table 2, last line, the numerals "43", "3[0]" and "9.5" should be aligned under the headings "Fresh paste", "24-hr paste" and "Conc. (g/300 ml.)", respectively. In Tab[le] 4, Ex. No. 29, the numeral "4.1" under "After heating" shoul[d] read --5.1--.

Signed and sealed this 15th day of June 1971.

(SEAL)
Attest:

EDWARD M. FLETCHER, JR.
Attesting Officer

WILLIAM E. SCHUYLER,
Commissioner of Paten[ts]